United States Patent [19]
Green et al.

[11] 3,733,483
[45] May 15, 1973

[54] ELECTRON SPECTROSCOPY
[75] Inventors: Brian Noel Green, Sale; John Merza Watson, Manchester, both of England
[73] Assignee: Associated Electrical Industries Limited, London, England
[22] Filed: Feb. 26, 1971
[21] Appl. No.: 119,327

[30] Foreign Application Priority Data

Feb. 27, 1970 Great Britain....................9,638/70

[52] U.S. Cl. .250/49.5 AE, 250/49.5 PE, 250/49.5 C
[51] Int. Cl................................................G01t 1/36
[58] Field of Search................250/41.9 ME, 49.5 C, 250/49.5 PE, 49.5 P, 49.5 AE, 49.5 A

[56] References Cited
UNITED STATES PATENTS 3,617,741  11/1971  Siegbahn et al.....................250/49.5

OTHER PUBLICATIONS

Electron Optics, by D. Klemperer, University Press, Cambridge, 1953, pages 56 & 62–72

Primary Examiner—William F. Lindquist
Attorney—Watts, Hoffmann, Fisher & Heinke

[57] ABSTRACT

An electron spectroscopy apparatus has an analyzer and a retardation lens system. In a first mode of operation, no retardation is applied, and the analyzer scans a low-energy range of the energy spectrum. In a second mode, retardation is applied, and the analyzer scans a high-energy range. The retardation is varied in synchronism with the scanning of the analyzer, so as to maintain a constant retardation factor.

8 Claims, 6 Drawing Figures

INVENTOR.
BRIAN N. GREEN
BY JOHN M. WATSON

Watts, Hoffmann, Fisher & Heinke
ATTORNEYS.

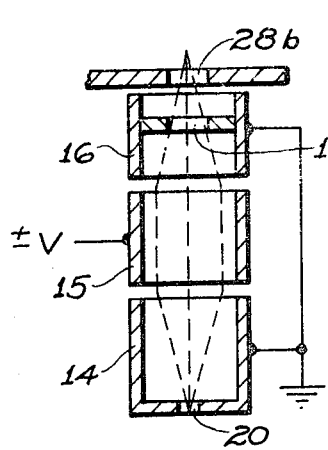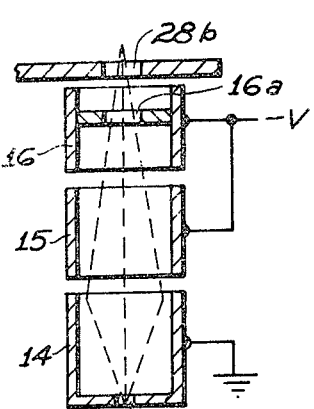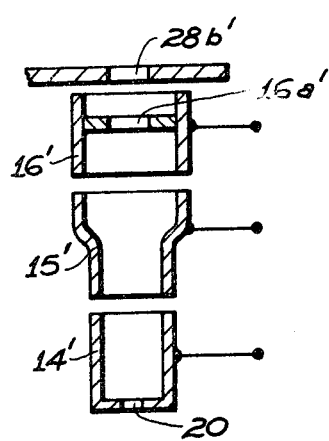
Fig. 2  Fig. 3  Fig. 4
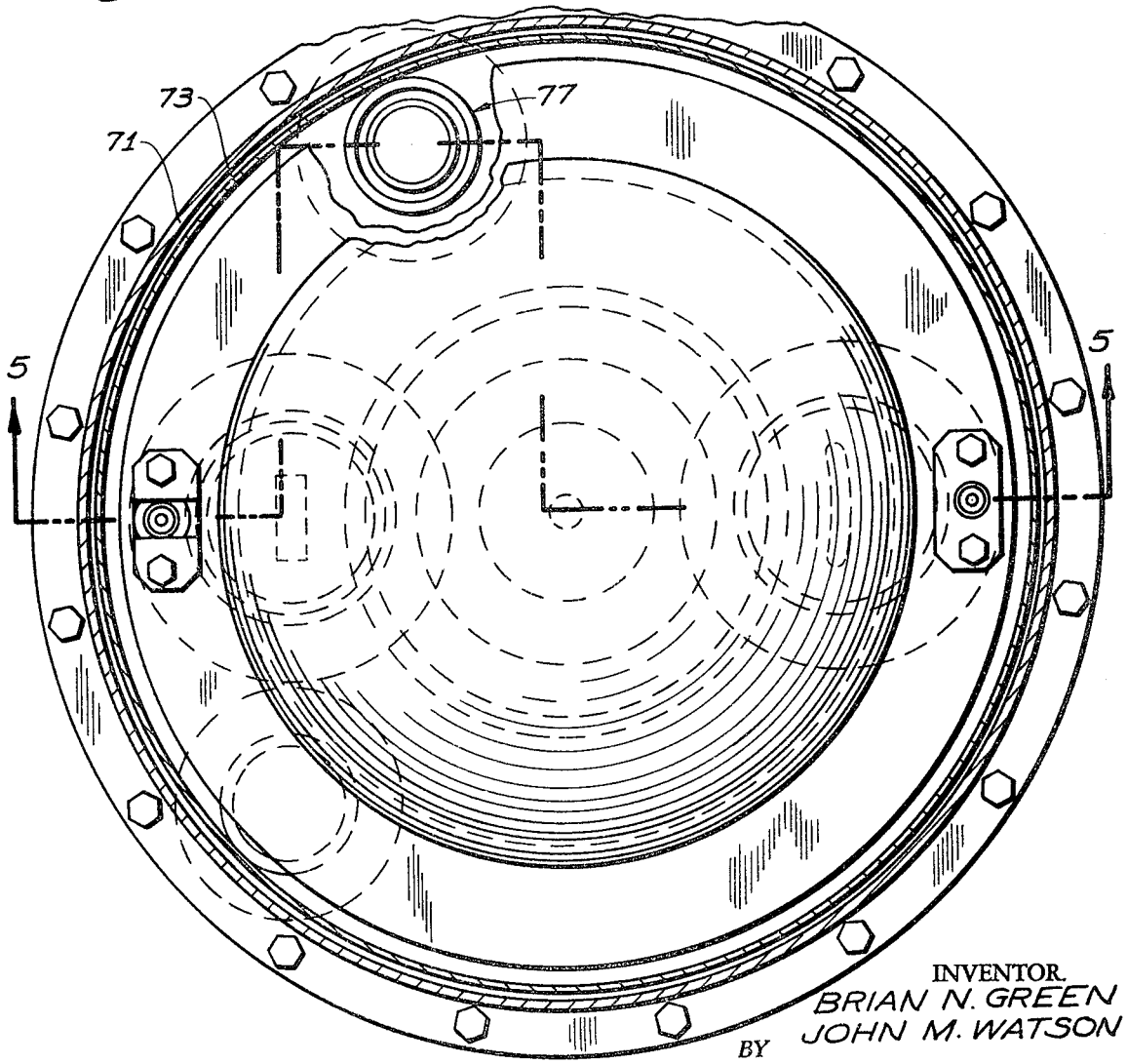
Fig. 6
INVENTOR.
BRIAN N. GREEN
JOHN M. WATSON
BY Watts, Hoffmann, Fisher & Heinke
ATTORNEYS

ELECTRON SPECTROSCOPY

CROSS REFERENCE TO RELATED PATENT

"Electron Source for Electron Spectrometry," Ser. No. 89,712, filed Nov. 16, 1970 by Albert Ashcroft and John M. Watson now abandoned.

BACKGROUND OF THE INVENTION

1. Field of the Invention

The present invention relates to apparatus for use in electron spectroscopy.

2. Prior Art

It is known in electron spectroscopy to irradiate a sample, for example, by means of photons or electrons, so as to release electrons from the sample. The energy of the electrons so released may be measured by means of an energy analyzer adapted to deflect the electrons by differing amounts according to their energies. The analyzer may be either an electrostatic or magnetic analyzer. The electrons so deflected may then be detected and their energy spectrum recorded.

The energy spectrum so obtained comprises a series of peaks, and from measurement of the energy positions of those peaks, and knowledge of the nature of the radiation used to irradiate the sample, it is possible to make deductions about the energy levels of the electrons in the sample, and therefore about the chemical structure of the sample.

In designing apparatus for use in electron spectroscopy, it is desirable to maximize the sensitivity of the apparatus without a loss in resolving power. Sensitivity is defined as the number of electrons received by a detecting means for a given number of electrons emitted from the sample. Resolution or resolving power is defined as being proportional to $E/\Delta E$ where $\Delta E$ is the minimum energy separation between two peaks of average energy $E$, for which the two peaks can be resolved by the apparatus.

In dealing with electrons of higher energy, the apparatus is required to have a higher resolution. By way of illustration, compare the situations where electrons are emitted from a first sample with their peaks at 1 kv and separated by 1 eV, while electrons are emitted from a second sample with their peaks at 50 volts and separated by 1 eV. In order for the analyzer to just resolve the peaks from each of these samples, the analyzer working with the first sample must have a resolution which is 20 times greater than the analyzer working with the second sample since the electron energies of the first sample are 20 times those of the second sample.

Since the resolution of an analyzer working with the lower energy electrons need only be one-twentieth of the resolution of an analyzer working with the higher energy electrons, it is therefore possible to increase the width of the source and exit slits of the analyzer working with the lower energy electrons. Increased slit widths permit more electrons to pass through the apparatus thereby increasing the sensitivity of the apparatus. Hence, since lower energy electrons require a lesser degree of resolution, higher sensitivities may be achieved when working with lower energy electrons.

In view of the foregoing, it has been recognized as being desirable to provide an apparatus which retards or reduces the energy of energy electrons before they enter the analyzer, whereby the analysis may be carried out with electrons of lower energy. However, such electron retardation is desirable only when operating with electrons of relatively high energies. If electrons of relatively low energies are retarded, their trajectories are extremely susceptible to perturbations in the apparatus. It is therefore also desirable to provide an apparatus which is capable of retarding electrons of high energies but which may be operated so as to not retard electrons of low energies.

Still another problem is commonly encountered when dealing with electrons of relatively high energies. When it is desirable to probe the sample with a relatively small diameter beam, the sample electron image frequently of a size too small to fill the slit apertures and results in poor sensitivity. It is therefore desirable to provide an apparatus capable of magnifying or enlarging the image of the electron source in the entrance plane of the analyzer.

It is also desirable to provide an apparatus having the capability of simultaneously performing the described magnification and retardation functions to maximize the sensitivity attainable when high energy electrons emitted from a sample being probed by a beam of small diameter.

SUMMARY OF THE PRESENT INVENTION

The present invention provides an apparatus for use in electron spectroscopy which is operable in a plurality of modes to selectively focus, retard or magnify the electron image passing from the sample into the analyzer.

In accordance with one aspect of the present invention, a three-component lens system is provided between the sample and the analyzer. By selectively connecting the lens components to ground or to a potential other than ground, the electron image may be electively focused, retarded or magnified.

In a first mode of operation, the first two lens components are connected to ground along with the sample and the third lens component is connected to a potential which is proportional to the analyzer supply voltage. The third lens component thereby provides a retarding voltage which significantly reduces the energy of electrons before they enter the analyzer. Moreover, since the retarding voltage is proportional to the analyzer supply voltage, a proportionately greater retarding voltage is applied by analyzing electrons of higher energy. Hence, electrons deflected in different parts of the scan are all retarded by substantially the same factor.

In a second mode of operation, the first and third lens components are connected to ground along with the sample. The intermediate lens components is connected to a potential, either positive or negative with respect to ground. By suitable adjustment of the potential, electrons can be focused toward a point which lies in entry plane of the electrostatic analyzer.

In a third mode of operation, the first lens component is grounded while the second and third lens components are maintained at a suitable negative retarding potential. By this arrangement, the lens system provides a magnification action which forms an enlarged image of the electron source in the entrance plane of the analyzer and provides a retardation action to reduce the energy of the electrons before they enter the analyzer. As previously explained, such magnification and retardation actions may be simultaneously advantageously employed where high energy electrons are emitted from a sample being probed by a beam of relatively small diameter. Preferably, the lens components are so dimensioned that the retardation is the same in both the first and third modes.

Accordingly, it is the principal object of the present invention to provide an improved apparatus for use in electron spectroscopy.

Other objects and a fuller understanding of the invention may be had by referring to the following description and claims taken in conjunction with the accompanying drawings.

BRIEF DESCRIPTION OF THE DRAWINGS

FIG. 2 is a schematic diagram illustrating the lens system connected for operation in a second mode;

FIG. 3 is a schematic diagram illustrating the lens system connected for operation in a third mode;

FIG. 4 is a schematic diagram illustrating an alternate embodiment of the lens system;

DESCRIPTION OF THE PREFERRED EMBODIMENT

Figure 1:
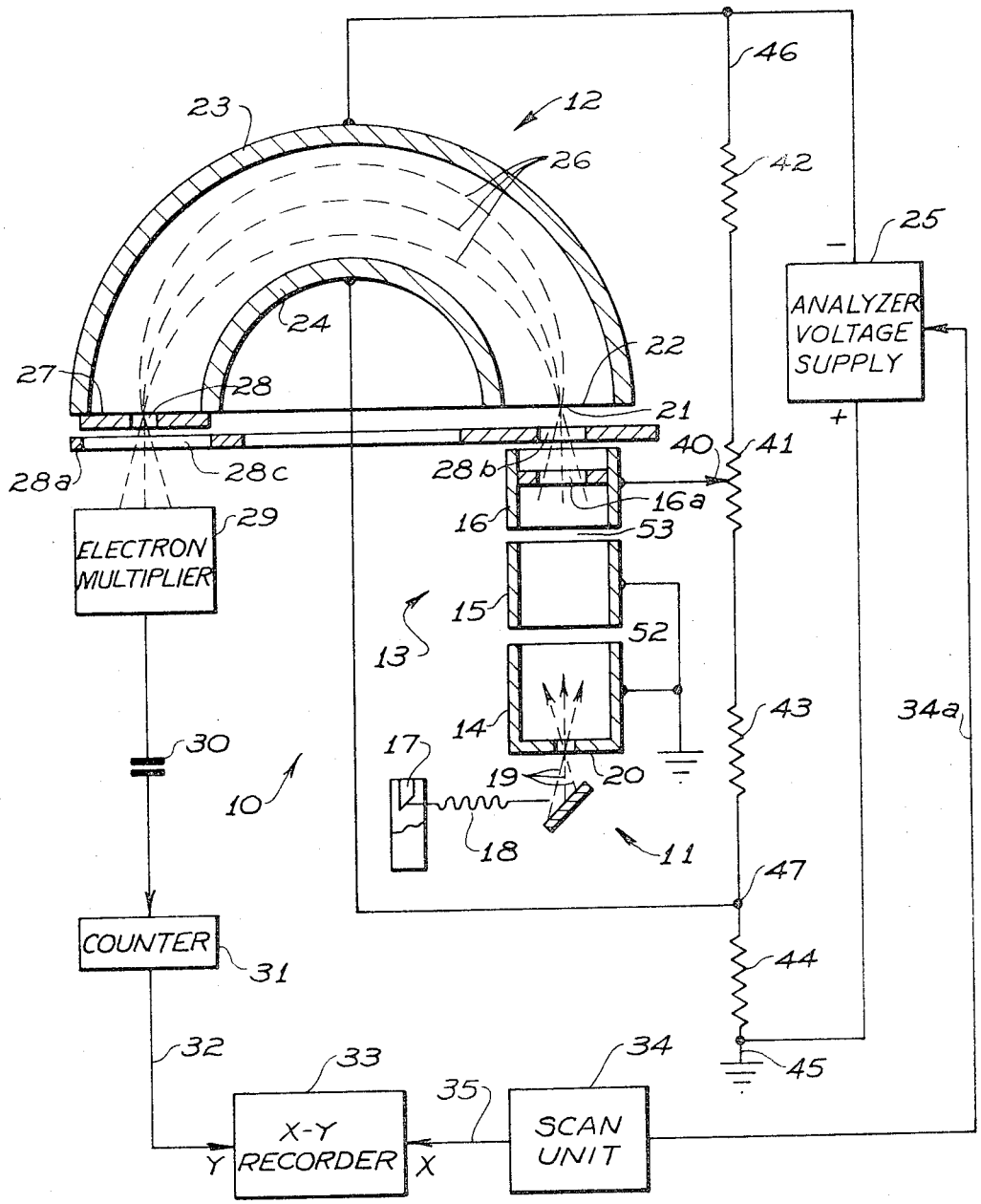
FIG. 1 is a schematic elevational diagram partially in cross-section of a spectrometer including the improved lens system of the present invention connected for operation in a first mode.

Referring to FIG. 1, an electron spectrometer is shown schematically at 10. The spectrometer includes a source apparatus shown generally at 11 and an electrostatic analyzer shown generally at 12. A lens system shown generally at 13 is interposed between the source apparatus 11 and the electrostatic analyzer 12. As will be explained in greater detail, the lens system 13 comprises three tubular lens components 14, 15, 16 to which potentials may be applied to operate on the stream of electrons passing from the source apparatus 11 into the electrostatic analyzer 12.

The source apparatus 11 includes an X-ray target 17. Electron bombardment of the X-ray target produces a beam of X-rays indicated by the arrow 18. A sample S is arranged to be irradiated by the X-ray beam. Electrons, indicated by the arrows 19, emitted from the sample S under irradiation pass through a variable source slit 20 into the lens system 13. The lens system 13, as will be explained, focuses the electrons toward a point 21 which lies in the entry plane 22 of the electrostatic analyzer 12. The angular divergence of the electrons leaving the focus 21 and passing into the analyzer 12 is defined by means of an angular aperture 16a situated within the lens component 16 and electrically connected thereto.

The electrostatic analyzer 12 comprises a pair of concentric metal hemispheres 23, 24. In operation, a voltage is applied between the hemispheres 23, 24 by means of an analyzer voltage supply 25. The outer hemisphere 23 is maintained at a more negative potential than the inner hemisphere 24 to cause electrons entering the space between the hemispheres to follow curved trajectories as indicated by the broken lines 26. The electrons are brought into focus in the exit plane 27 of the analyzer 12, diametrically opposed to their point of entry 21.

Electrons with greater energies will follow trajectories of greater radius in moving through the analyzer 12. As will be explained, the potential of the lens component 16 may be adjusted so that the electrons passing along the central path through the analyzer have substantially the same energy as they had on leaving the lens system 13.

Electrons of different energies will be focused at different points on the exit plane 27. In order to select electrons having energies within a certain restricted range of the energy spectrum, an exit slit 28 is arranged in the exit plane 27.

A fringe field plate 28a may be positioned adjacent the bases of the hemispheres 23, 24, to overcome fringe field effects of the edges of the analyzer 12. The plate 28a is of flat annular shape having two apertures 28b, 28c respectively adjacent the focus 21 and the exit slit 28. The plate 28a is held at a potential intermediate the potentials of the hemispheres 23,24 by means not shown.

Electrons passing through the slit 28 are detected by an electron multiplier 29. The output of the electron multiplier 29 is fed via a coupling capacitor 30 to a counter 31 which produces an output signal proportional to the rate at which electrons arrive through the slit 20. This output, as indicated by the arrow 32 is fed to the Y-input of an X-Y recorder 33.

In order to scan the energy spectrum of electrons focused on the exit plane 27, the voltage supplied between the hemispheres 23, 24 is swept through a predetermined range by means of a scan unit 34. The scan unit 34 provides a variable signal as indicated by the arrow 34a in order to scan the analyzer voltage supply 25 such that the energy spectrum of electrons is scanned by the exit slit 28. A signal proportional to the analyzer voltage, as indicated by the arrow 35, is fed from the scan unit 34 to the X-input of the X-Y recorder 33. The recorder 33 thus produces a record of the energy spectrum of the electrons from which the chemical structure of the sample S may be determined.

The lens system 13 may be operated in a variety of modes to produce different effects on the electrons passing therethrough. In a first mode of operation, shown in FIG. 1, the first two lens components 14, 15 are both connected to ground along with the sample S. The third lens component 16, however, is connected to a sliding contact 40 of a potentiometer 41. The potentiometer 41 comprises part of a potential divider network connected between negative and positive terminals of the analyzer voltage supply 25. The divider network additionally includes resistors 42, 43, 44 connected in series with the potentiometer 41. The positive end 45 of the potential divider network is grounded.

The outer hemisphere 23 is connected to the negative end 46 of the potential divider network. The inner hemisphere 24 is connected to a point 47 between the resistors 43, 44. By this arrangement, the potential applied to the third lens component 16 is negative with respect to the lens components 14, 15 and is proportional to the analyzer supply voltage. By suitable adjustment of the sliding contact 40, the potential of the lens component 16 can be made substantially equal to the potential of electrons passing along a central path 26 through the analyzer 12 so that electrons passing through the analyzer will have substantially the same energies as they had when leaving the lens system 13.

The negative potential applied to the third lens component 16 acts as a retarding voltage to significantly reduce the energy of the electrons before they enter the electrostatic analyzer. Moreover, since the retarding voltage is derived from the deflecting voltage by means of a potential divider, as the energy spectrum is scanned, a proportionately greater retarding voltage is applied when analyzing electrons of higher energy. Hence, electrons deflected in different parts of the scan are all retarded by substantially the same factor.

As has been explained, the described first mode of operation is particularly advantageous in analyzing the higher energy part of the energy spectrum. On the other hand, the first mode of operation is not acceptable for analyzing the lower energy part of the spectrum since electrons emitted from the sample with energies in the order of 100eV or less would have such low energies, after retardation by any substantial factor, that they would be extremely susceptible to various perturbations in the analyzer which cannot be easily corrected or removed.

A second mode of operation will now be described which is more advantageously employed to analyze the lower energy part of the energy spectrum. As illustrated in FIG. 2, the second mode of operation for scanning the energy spectrum below 100eV is effected by connecting the first and third lens components 14, 16 to ground along with the sample S. The intermediate lens component 15 is connected to a potential, either positive or negative with respect to ground, so chosen that the electrons are focused in the plane 22 by the lens system 13. As in the first mode of operation, the potential of the central electron path through the analyzer is substantially the same potential as the third lens component 16 so that the energies of the electrons in the analyzer are substantially the same as the energies of electrons leaving the lens system 13. Thus, it will be understood that the potentials of the hemispheres 23, 24 will be substantially equal, but of opposite polarity with respect to ground. Hence, in this mode of operation there is substantially no acceleration or retardation applied to the electrons, and the lens system 13 functions purely as a focusing device.

A third mode of operation may be advantageously employed when the energy of the electrons is relatively high but the irradiated area of the sample S is very small, as, for example, when the sample S is exposed to a fine probe of radiation such as an electron beam having a diameter at the sample S of about 0.01 inch or less. As illustrated in FIG. 3, the third mode of operation provides for the grounding of the first lens component 14 while the second and third lens components 15, 16 are connected to a potential which is negative with respect to ground. As in the described first and second modes of operation, the arrangement is such that the potential of the central electron path through the analyzer 12 is substantially equal to the potential of the third lens component 16.

The first and second lens components 14, 15, being at different potentials, act as an electron optical lens, due to the shape of the electric field in the gap 52 between them. In addition, since the second lens component 15 is at a negative potential with respect to the first lens component 14, electrons passing through these components will be retarded, as in the first mode of operation. By suitable choice of the potential difference between the first and second lens components 14, 15 (which will again be arranged to be proportional to the potential between the hemispheres 23, 24) it can be arranged that the electrons are retarded by this same factor R as in the first mode of operation. It is advantageous to have the same retardation in both these modes, since it will not then be necessary to alter the slit widths of the spectrometer when switching between these modes. In addition, by suitably choosing the ratio of the distances between the slits 20 and the gap 52, and between the gap 52 and the plane 22, it can be arranged that the electrons are brought to a focus 21 on the plane 22, so as to form in that plane an electron optical image of the source slit 20. With this choice of potential difference and this choice of dimensions for the lens components, it can be shown that the electron optical image has a magnification of $\sqrt{R}$.

For example, where the initial energy of electrons emitted from the sample is 1 KV, and the energy of the electrons after retardation is 50 volts, the factor R will be 20, and the magnification at the focus 21 in the third mode of operation will be equal to $\sqrt{20}$.

The third mode of operation, thus provides a magnification of greater than unity at the focus 21 and is useful where the effective area of the source of electrons is very small. For example, when electrons are released from a sample under the action of a fine probe of radiation, operation in the third mode enables a greater angular distribution of electrons from the sample to pass through the angular aperture 16a into the analyzer and thus increases the sensitivity of the apparatus.

Referring to FIG. 4, a modification of the lens system is shown wherein the diameter of the lens components are not equal as in the aforedescribed embodiments. A lens system 13' is provided having three lens components 14', 15', 16'. A variable source slit 20' is provided at the entrance of the first lens component 14'. The first lens component 14' and the lower end of the second lens component 15' are of equal diameter. The third lens component 16' and the upper end of the second lens component 15' are of equal diameter. Such a lens component arrangement is operated in a similar manner to that previously described, but in this embodiment, the magnification obtained in the third mode of operation will not be equal to $\sqrt{R}$.

As will be apparent from a comparison of the potentials applied to the lens system components 14, 15, 16 in the first and third modes, the third mode differs from the first mode primarily in that the second lens component 15 is connected to ground in the first mode and has a potential applied to it in the third mode. In the first mode of operation, a magnification of unity is provided while electrons are retarded by a factor of R. In the third mode, electrons are retarded by a factor of R and magnified by a factor other than unity. Although the magnification factor may be varied by selecting lens components of dissimilar diameters, where the lens components are of equal diameter as shown in FIG. 1, the resulting magnification factor will be $\sqrt{R}$.

It will be appreciated that in alternative arrangements in accordance with the present invention, radiation other than X-radiation may be used to irradiate the sample, such as, for example, electrons, ultraviolet light, or other electromagnetic radiation. It will also be appreciated that while in the described arrangement the sample is in solid form, the invention is also applicable where the sample is of liquid or gaseous form.

Figure 5:
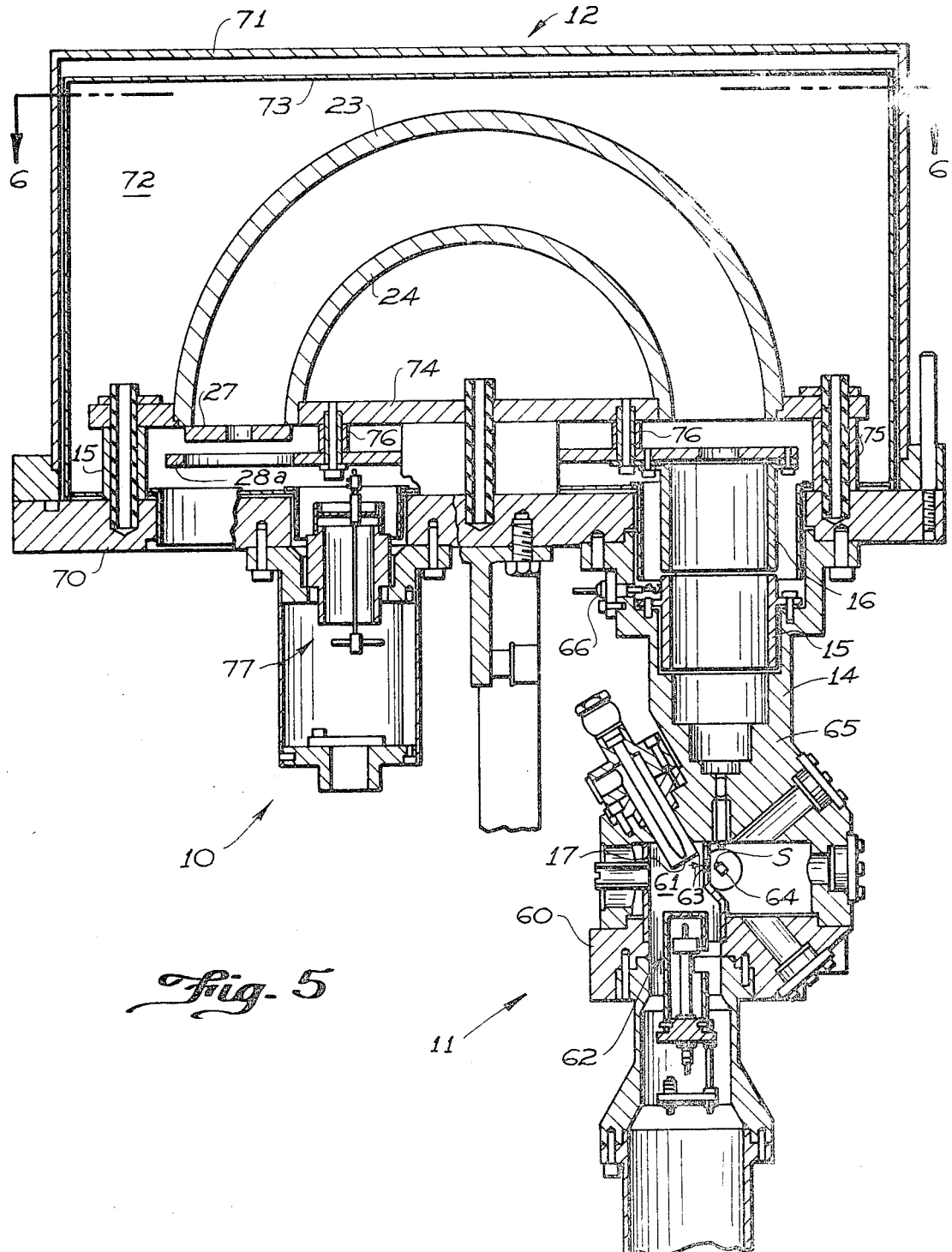
FIG. 5 is a sectional elevational view of a spectrometer including the improved lens system; and, FIG. 6 is a sectional view as seen from the plane indicated by the line 6—6 in FIG. 5.

Referring to FIG. 5, one embodiment of the electron spectrometer 10 is shown in greater detail. The source apparatus 11 is of the type described and claimed in detail in the referenced application of Ashcroft and Watson. A source housing 60 defines a chamber 61 therein. An electron gun shown generally at 62 emits electrons along a path directed toward the X-ray target 17. Under such electron bombardment, the X-ray target 17 emits X-rays which pass through a slit structure and strike the sample S. The sample S is positioned on a sample support 64 which is removably positioned in the chamber 61.

The source housing 60 includes a tubular portion 65 which extends toward the electrostatic analyzer 12. Electrons emitted from the sample S travel through the tubular housing portion 65 toward the electrostatic analyzer 12.

The lens system of the present invention includes first, second and third lens components 14, 15, 16. The first lens component 14 is formed integrally with the source housing 60 as shown in FIG. 5. In each of the three described modes of operation, the first lens component 14 is grounded and therefore need not be insulated from the source housing 60. The second and third lens components 15, 16 are, however, electrically insulated from the source housing 60 in order that the various potentials used in each of the three operating modes may be applied to these components. Electrical connection with the second and third lens components 15, 16 is made by means of electrical terminals, one of which is shown generally at 66.

The electrostatic analyzer 12 includes a base plate 70. A vacuum evacuable enclosure 71 is secured to the base plate and defines a chamber 72 therein. A paramagnetic screen 73 of mu-metal encloses the operating components of the analyzer and serves to reduce magnetic and electromagnetic perturbations of the electron trajectories by stray fields.

The metal hemispheres 23, 24 are mounted concentrically above a mounting plate 74 of electrically insulative material. The mounting plate 74 is, in turn, mounted above the base plate 70 by means of insulators 75. Electrical connection is made with the hemispheres 23, 24 by terminals, not shown, which extend through the base plate 70.

The fringe field plate 28a is supported by insulators 76 which depend from the mounting plate 74. Electrical connection is made with the fringe field plate 28a by means of an electrical terminal structure shown generally at 77 which extends through the base plate 70. The disposition of the terminal 77 is rotated from the plane of FIG. 5 as is better seen in FIG. 6.

Although the foregoing description is necessarily of a detailed character, in order that the invention may be set forth, it is to be understood that the specific terminology is not intended to be restrictive or confining, and that various rearrangements of parts and modifications of detail may be resorted to without departing from the scope or spirit of the invention as herein claimed.

What is claimed is:

1. Apparatus for use in electron spectroscopy for chemical analysis of a sample, comprising:
    a. means for irradiating the sample to release electrons from the sample;
    b. an energy analyzer for analyzing the energies of said electrons released from the sample;
    c. scan control means for causing said analyzer to scan through the energy spectrum of said electrons; and,
    d. retarding means for producing retardation of said electrons before they enter the analyzer, the retarding means being controlled by said scan control means in synchronism with the scan of the analyzer to vary said retardation proportionally with the energy of the electrons in the part of said spectrum being scanned by said analyzer.

2. Apparatus according to claim 1 wherein said energy analyzer comprises a pair of electrodes between which said electrons pass, and means for applying a voltage between said electrodes so as to deflect electrons by different amounts according to their energies.

3. Apparatus according to claim 2 wherein said scan control means comprises means for sweeping said voltage through a range of values.

4. Apparatus according to claim 3 wherein said retarding means comprises an electrostatic lens system, and means for applying a control voltage thereto proportional to the voltage applied between the electrodes of the analyzer.

5. A method of electron spectroscopy for chemical analysis of a sample, comprising the steps of:
    a. irradiating the sample so as to release electrons from the sample;
    b. passing said electrons into an energy analyzer and operating said analyzer to scan through the energy spectrum of said electrons released from the sample; and,
    c. concurrently with operation of said analyzer, producing retardation of the electrons before they enter the analyzer and varying said retardation in synchronism with the scan of the analyzer and proportionally with the energy of the electrons in the part of said spectrum being scanned by said analyzer.

6. A method of electron spectroscopy for chemical analysis of a sample, comprising the steps of:
    a. irradiating the sample so as to release electrons from the sample;
    b. forming said electrons into a beam;
    c. passing said beam of electrons into an energy analyzer substantially without retardation, and operating said analyzer to scan a first energy range of the energy spectrum of said electrons released from the sample;
    d. retarding said beam of electrons so that the electrons therein have lower energies than they had on being released from said sample; and,
    e. passing the retarded beam of electrons into said energy analyzer and operating said analyzer to scan a second, relatively higher energy range of said energy spectrum.

7. A method according to claim 6, wherein during said steps said beam of electrons is brought to a focus before entering said analyzer, with a substantially unit electron optical magnification.

8. A method according to claim 6 wherein, during the step of scanning said first energy range said beam of electrons is brought to a focus before entering said analyzer, with a substantially unit electron optical magnification, and during the step of scanning said second energy range said beam of electrons is brought to a focus before entering said analyzer with an electron optical magnification substantially greater than unity.

* * * * *